April 14, 1936. C. W. SPICER 2,037,281
UNIVERSAL JOINT
Filed July 29, 1932 2 Sheets-Sheet 1

INVENTOR:
CLARENCE W. SPICER
ATTORNEYS

INVENTOR:
CLARENCE W. SPICER
ATTORNEYS

Patented Apr. 14, 1936

2,037,281

UNITED STATES PATENT OFFICE 2,037,281

UNIVERSAL JOINT

Clarence W. Spicer, Toledo, Ohio

Application July 29, 1932, Serial No. 625,820

10 Claims. (Cl. 64—17)

This invention relates to universal joints, particularly universal joints which operate in lubricant containing housings, and as its principal object aims to provide novel means for insuring an adequate supply of lubricant to the cooperating journal and bearing surfaces of the joint members.

Another object of this invention is the provision of a universal joint of the type referred to, wherein at least one of the joint members is provided with means which is adapted to pick up lubricant upon rotation of the joint and to direct the lubricant toward the cooperating journal and bearing portions of the joint members.

A further object of this invention is the provision of a universal joint of the type mentioned, which embodies a lubricant reservoir for feeding lubricant to the cooperating journal and bearing portions of the joint members, and wherein at least one of the joint members is provided with a passage for picking up and supplying lubricant to said reservoir upon rotation of the joint.

Other objects and advantages of the invention will be apparent from the following description when taken in conjunction with the accompanying sheets of drawings, wherein Fig. 1 is a longitudinal sectional view taken through a universal joint structure embodying my invention;

In the accompanying drawings, to which detailed reference will now be made, I have illustrated several universal joints embodying my invention, but it should be understood that the invention is not to be regarded as limited to the particular forms illustrated, since it may be incorporated in various other structural arrangements.

The invention is particularly applicable to universal joints which operate in lubricant containing housings, and consists in the provision of means for insuring an adequate supply of lubricant to the cooperating journal and bearing portions of the joint members. It is well known that if sufficient lubricant is not supplied to the cooperating journal and bearing surfaces of the joint members, excessive wear will occur at these points resulting in noisy operation and necessitating early repairs. Such inadequate lubrication may result from the action of centrifugal force in constantly throwing lubricant outwardly away from the cooperating surfaces where it is needed, or from channeling of the joint members through the body of lubricant, as may occur in cold weather or when the lubricant being used is too heavy. According to my invention, as will be explained more fully hereinafter, I provide means for picking or scooping up some of the lubricant, upon rotation of the joint, and directing the same to the desired points.

Figure 1:
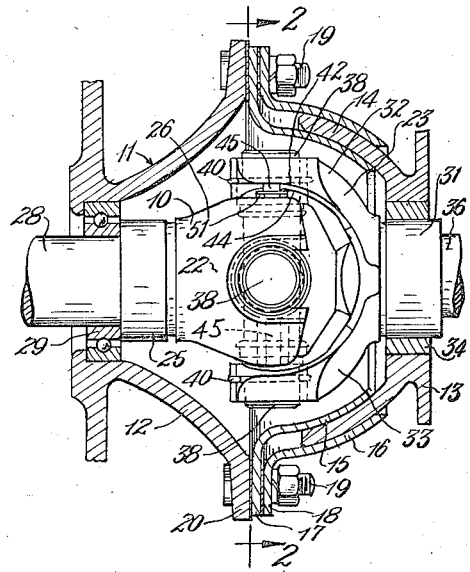
Figure 2:
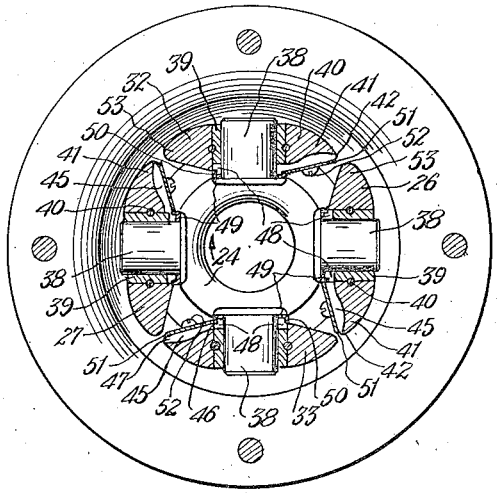
Fig. 2 is a transverse sectional view taken substantially on line 2—2 of Fig. 1.

In Figs. 1 and 2 of the drawings I have shown the invention embodied in a universal joint 10, which is of the yoke type and which is arranged to operate in a lubricant containing housing 11. This housing may be of any suitable construction, depending upon the location and use of the universal joint, and in this instance, comprises a stationary member 12, which may be the rearward portion of the transmission casing of a motor vehicle, and a relatively movable member 13, which may be the forward end of a torque tube. As is usual in constructions of this kind, the movable member may be operatively connected with the stationary member by providing the former with a substantially spherically-shaped flange or wall portion 14 which is universally slidable between similarly shaped plate members 15 and 16. The latter members are provided, respectively, with outwardly extending annular flanges 17 and 18, and are secured to the stationary member 12 by means of bolts 19 extending through the flanges 17 and 18 and through the annular flange 20 of the stationary member.

The universal joint itself comprises yoke members 22 and 23, and a connecting ring 24 disposed between the yoke members. The yoke member 22 is provided with a hub portion 25 and with a pair of spaced arms 26 and 27 formed integral therewith. The hub portion 25 is operably connected to, and may be supported by, the shaft 28 which is, in turn, supported in a bearing 29 mounted in the stationary member 12. The yoke member 23 is provided with a hub portion 31, and with spaced arm portions 32 and 33 formed integral with the hub portion. This hub portion may be supported by a bearing 34, mounted in the movable member 13, and is provided with a suitable opening for connecting the yoke member to the forward end of the propeller shaft 36.

The yoke members are operatively connected together in this instance by the ring member 24, the latter being provided with pairs of outwardly projecting aligned trunnions or journal portions 38 which engage in bearing sleeves or bushings 39 mounted in the arm portions of the yoke members. The bushings 39 may be retained in proper position in the respective yoke arms by any suitable means, such as the resilient wire retaining rings 40 which engage in cooperating grooves formed in the bushings and in the yoke arms. When the connecting member 24 is in assembled position with its journal portions extending into the arms of the yoke members, as shown in the drawings, it will be noted that the ends of the arms of one yoke member are disposed in circumferential alignment with, and between, the ends of the arms of the other yoke member, sufficient clearance being provided between the yoke arms to permit the desired universal movement of one yoke member relative to the other without interference.

As stated above, the housing 11 contains a body of lubricant which may be introduced thereinto from the transmission casing, or may be supplied by any other appropriate means. To insure an adequate supply of this lubricant being delivered to the cooperating surfaces of the journal portions and bearing sleeves, I utilize the yoke arms as a means for directing the lubricant toward the cooperating surfaces during the rotation of the joint. To this end I have constructed each arm with a tapered leading portion 41 which acts as a scoop or shovel for picking up lubricant, as the joint is rotated, and directing such lubricant toward the cooperating journal and bearing sleeve surfaces. Each of these tapered leading portions is preferably provided with a relatively sharp leading edge 42. Obviously, there will be a tendency for the lubricant, which is picked up by the leading portions of the yoke arms, to be thrown outwardly from the arms by centrifugal force due to the rotation of the joint. To overcome the effect of this centrifugal force, I construct the yoke arms so that each leading portion is provided with an inclined face or surface 44 adjacent the edge 42 and disposed in such angular relation to the axis of the journal portion extending into that yoke arm, that the inertia of the mass of lubricant which has been picked up by the edge 42 will cause the lubricant to travel up the slope of the inclined surface toward the inner end of the bushing surrounding the journal portion.

To assist in directing the lubricant toward the cooperating journal portions and bushings, it may be desirable to provide each leading arm portion with a channel or groove 45 which is recessed into the surface 44. This channel is arranged with its inner or discharge end 46 adjacent the inner end of the bushing, and with its outer or inlet end 47 substantially at the leading edge of the arm, so that upon rotation of the joint, lubricant will be picked or scooped up by the inlet opening of the channel and forced upwardly within the latter to the inner end of the bushing.

In order that an adequate supply of lubricant may be available for the cooperating surfaces of the journal portions and bushings, an annular reservoir 48 may be provided around the inner end of each journal portion. These reservoirs may be conveniently formed by constructing the bushings of a length somewhat less than the thickness of the yoke arms in which they are mounted, thereby providing in each yoke arm an annular groove or reservoir having the inner end of the bushing as its bottom wall. To increase the capacity of this reservoir, and to prevent the lubricant from escaping from the reservoir in any other manner than by passage outwardly between the cooperating surfaces of the bushings and journal portions, I provide an annular ring 49 which surrounds the journal portion. This ring is formed with an angularly disposed annular flange 50 which extends axially of the journal portion and into the yoke arm opening in which the bushing is mounted. It will be noted from the drawings that the inner or discharge ends of the channels 45 communicate with the reservoirs of the yoke arms, so that the lubricant scooped up by the leading edges of the yoke arms, during rotation of the joint, will be supplied to the reservoirs to maintain the latter in a filled condition.

It should be understood that the use of the channels 45 is not necessary, and if desired, they can be omitted and the supply of lubricant to the inner ends of the bushings obtained simply by the action of the leading edge and inclined surface contiguous thereto in picking up and directing the lubricant toward the desired point. I prefer, however, to employ these channels since they perform the function of positively directing the lubricant to the desired location by preventing the lubricant from sliding off or being thrown off the inclined face of the yoke arm portion. When such channels are employed, I prefer to provide the same with cover plates 51, which may be appropriately shaped pieces of sheet metal, and may be secured to the inclined arm surfaces 44 by suitable means such as screws 52. When these cover plates are mounted upon the arm portions, as indicated in Fig. 2, they constitute closures which convert the open channels to passages having openings only at their ends. The closing of the channels by the cover plates 51 assists in preventing the lubricant which has been picked up by the leading edges, from being thrown off the arm portions and causes it to be positively directed to the desired points which, in this instance, are the reservoirs 48.

In order that the leading portions of the yoke arms may perform the desired shovel-like action with maximum effectiveness, it is necessary that the lubricant of the housing 11 be permitted to flow readily into the path of movement of the leading portions and, accordingly, the trailing portions 53 of the yoke arms are tapered and preferably shortened somewhat, as shown in the drawings, so that they do not overlap the leading edges of the adjacent yoke arms and do not interfere with the lubricant being readily picked up by the latter. It will also be noted that the outer surfaces of the yoke arm portions, particularly the outer surface of the trailing portions 53, are curved to substantially streamline form so that the lubricant will not be deflected outwardly toward the wall of the housing, or otherwise disturbed, but will flow smoothly over the curved surface toward the leading portion of the next yoke arm.

Figure 3:
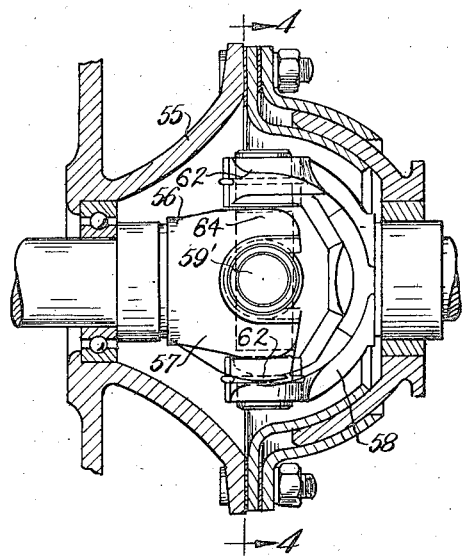
Fig. 3 is a longitudinal sectional view taken through another universal joint structure embodying my invention.
Figure 4:
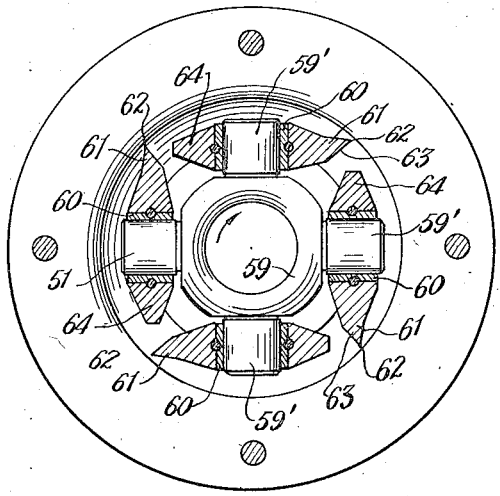
Fig. 4 is a transverse sectional view thereof taken substantially on line 4—4 of Fig. 3.

In Figs. 3 and 4 of the drawings, I have shown a universal joint construction, which is generally similar to that of Figs. 1 and 2, and which comprises a lubricant containing housing 55, and a universal joint 56 rotatable therein. The universal joint comprises yoke members 57 and 58, and a connecting member 59 disposed therebetween, the latter member having pairs of aligned journal portions 59' extending into bearing sleeves or bushings 60 mounted in the arms of the yoke members.

In this construction, an adequate supply of lubricant, for the cooperating surfaces of the bushings and journal portions, is insured by providing each yoke arm with a leading portion 61 of such shape that it will pick up some of the lubricant upon rotation of the joint, and will direct the lubricant toward the inner end of the bushings. This desired lubricant distributing action of the yoke arms, is obtained by providing the latter with the cross-sectional shape illustrated in Fig. 4. As shown in this figure, each leading yoke arm portion is formed with a relatively sharply tapered leading edge 62, so disposed that the inclined inner face 63 of the tapered portion lies substantially on a radial line which passes through the axis of rotation of the joint. The leading portions of the yoke arms are made relatively long as compared with the trailing portions 64, and project outwardly beyond any other portion of the yoke members so that upon rotation of the joint the radially disposed faces 63 will perform the function of plowing up or scooping up some of the lubricant contained within the casing. The lubricant which is plowed up by the faces 63 travels upwardly along the inclined faces or surfaces 64 and is directed by the latter to the inner end of the bushings. It will be seen in the arrangement described that the extended length of the leading portion of the yoke arm and corresponding shortening of the trailing portions, allows the lubricant to readily come in contact with the radially disposed faces 63, so that upon rotation of the joint the lubricant will be deflected inwardly toward the desired point.

Figure 6:
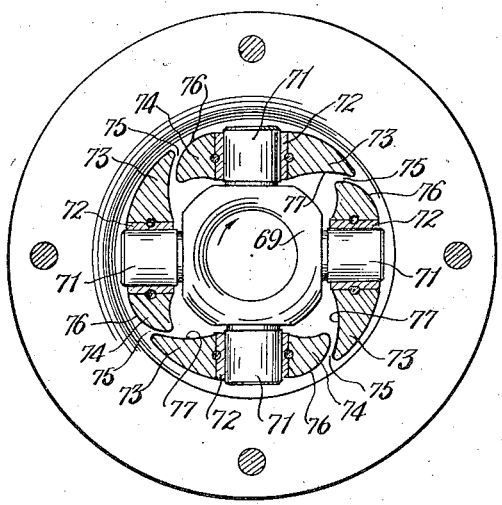
Fig. 6 is a transverse sectional view thereof taken substantially on line 6—6 of Fig. 5.
Figure 5:
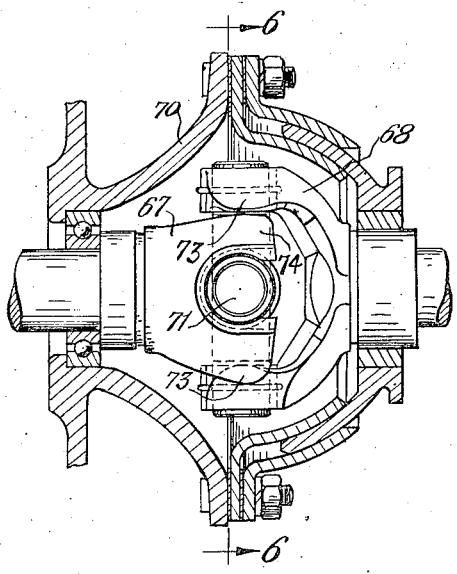
Fig. 5 is a longitudinal sectional view taken through still another universal joint structure embodying my invention.

In Figs. 5 and 6 of the drawings, I have shown another universal joint construction which is generally similar to that illustrated in Figs. 3 and 4, and wherein a universal joint comprising yoke members 67 and 68, and a yoke connecting member 69, is arranged for rotation within a lubricant containing housing 70. In this construction, the arm portions of the yoke members are connected to the member 69 by providing the latter with pairs of aligned journal portions 71 which engage in bearing sleeves or bushings 72 mounted in the yoke arms. As in the universal joint constructions already described, the arm portions of the yoke members are shaped to perform the function of picking up and directing lubricant toward the inner ends of the bushings upon rotation of the joint within the housing. In this construction, however, the tapered leading portion 73 of each yoke arm is made relatively long as compared with the trailing portion 74, so that when the yoke members are in assembled position, as illustrated in Fig. 6, the leading portion will overlap the trailing portion of the next adjacent yoke arm. The overlapping leading and trailing portions of adjacent yoke members thus cooperate to provide a clearance and lubricant conducting passage 75 therebetween. It will be noted that both of these cooperating edge portions are of arcuately tapered form, but that the leading portion is somewhat longer than the trailing edge portion so that the former projects outwardly sufficiently to perform the function of a shovel or scoop for picking up lubricant as the joint is rotated. The trailing portion 74 is provided with a convex outer surface 76 which is spaced from, and cooperates with, an inner concave surface 77, provided on the leading portion 73, in forming the walls of the passage 75. The curvature of the surfaces 76 and 77 determines the direction in which the passage 75 extends, and as will be seen from Fig. 6, the direction of this passage is such that lubricant picked up by the leading portion will be deflected or directed toward the inner end of the bushing 72, as the joint is rotated. It will also be seen that because of the trailing portion of each yoke arm being made relatively short as compared with the leading portion, the lubricant can be readily picked up by the latter portion. Moreover, as seen in Fig. 6, the convexly curved outer surface 76 of the trailing portion is of substantially streamline form, and does not disturb the lubricant of the casing to an extent which would prevent it from being readily picked up by the leading portion of the yoke arm immediately following.

Figure 7:
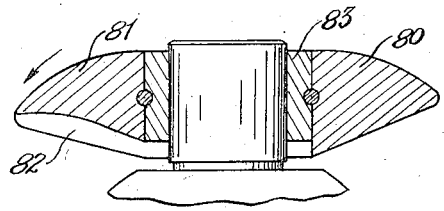
Figs. 7 to 10 inclusive are detached sectional views showing various cross-sectional shapes which the arm portions of the joint members may assume.
Figure 8:
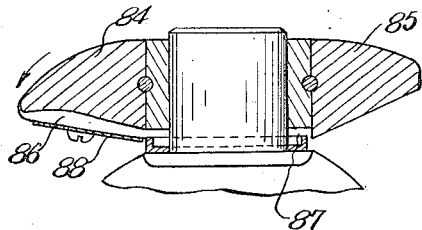

In Figs. 7 to 10, inclusive, of the drawings, I have shown other cross sectional shapes which may be used for the arm portions of the yoke members. The cross sectional shapes shown in Figs. 7 and 8 are substantially the same as those illustrated in Fig. 2 except that in Fig. 7 the trailing portion 80 is of substantially the same shape as the leading portion 81 instead of being shortened somewhat as in Fig. 2. In this construction, the leading portion 81 may be provided with a channel 82 for assisting in the directing of the lubricant toward the inner end of the bushing 83. In Fig. 8 the leading portion 84 is somewhat longer and more sharply tapered than the trailing portion 85 and, if desired, may be provided with a channel 86 which communicates with a reservoir 87. It should be understood, however, that the channels may be omitted if desired, or if used, may be provided with a closure plate 88.

Figure 9:
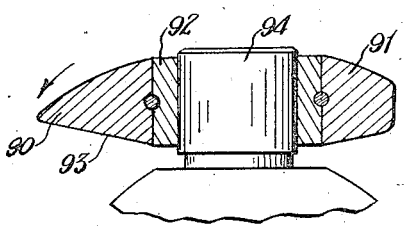
Figure 10:
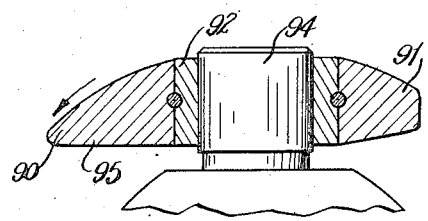

In Figs. 9 and 10 of the drawings I have shown yoke arm portions provided with elongated, relatively sharply tapered leading edge portions 90, and trailing edge portions 91 which are relatively short or blunt so as to interfere as little as possible with the function of the leading edge portions in picking up the lubricant and directing it toward the inner ends of the bushings 92. In Fig. 9 the inner face 93 of the tapered leading portion 90 lies in a plane which is disposed in angular relation to the axis of the journal portion 94, while in Fig. 10 the inner face 95 lies in a plane which intersects the axis of the journal portion 94 at right angles. During rotation of a universal joint embodying the cross-sectional shapes illustrated in Figs. 9 and 10, there will be a greater tendency for centrifugal force to cause lubricant to slide off the inclined face 93 than off the relatively flat face 95, but on the other hand the inclined face 93 would be more effective in picking up lubricant. Accordingly, it will be readily seen that for different conditions of operation, the inclination and shape of the inner face of the leading arm portions may be varied somewhat from those illustrated in Figs. 9 and 10 and in the other figures of the drawings.

It will be noted that in the several views of the drawings I have illustrated numerous different cross-sectional shapes for the arm portions of the yoke members, and it should be understood that these are for purposes of illustration in disclosing the invention, and do not represent all of the cross-sectional shapes which could be used or which might be desirable in practicing my invention. Moreover, it should be understood that the channels and reservoirs illustrated and described in connection with certain of the cross-sectional shapes could, if desired, be embodied in any or all of these cross-sectional shapes which are shown without channels or reservoirs.

In the several universal joints illustrated in the drawings I have shown the arm portions of the yoke members as being spaced slightly from the body portion of the connecting member, which is in accordance with the practice of certain motor vehicle manufacturers, but if desired, this space may be omitted and the inner faces of the yoke arms and the inner ends of the bushings made to engage the body portion of the connecting member. When the inner face of the yoke arm engages the body portion of the connecting member in this manner, the lubricant reservoir will, of course, be closed by the connecting member itself and the closure rings, shown in Figs. 2 and 8, are not required.

It will now be readily seen that I have provided a novel form of universal joint construction wherein one or more of the joint members are provided with means for picking up lubricant, as the joint is rotated within a lubricant containing housing, and directing that lubricant toward cooperating surfaces requiring lubrication, such as the cooperating surfaces of the journal and bearing portions of the joint members. Moreover, it will be seen that in providing means for picking up lubricant and positively directing it to the cooperating surfaces, an adequate supply of lubricant will be insured for the latter surfaces, and the destructive wear which might otherwise result from an inadequate supply of lubrication to these parts, will be largely avoided.

Although in disclosing my invention I have referred to, and illustrated, universal joints which are designed and arranged in accordance with motor car practice, it should be understood that my invention may be embodied in universal joints of other forms, as well as in universal joints intended for various other machines and uses.

While I have illustrated and described the universal joint structure of my invention in a detailed manner, it should be understood, however, that I do not intend to limit myself to the precise details of construction and arrangement of parts illustrated and described, but regard my invention as including such changes and modifications as do not involve a departure from the spirit of the invention and the scope of the appended claims.

Having thus described my invention, I claim:

1. In a device of the character described the combination of a housing adapted to contain lubricant, and a universal joint rotatable in said housing, said joint being provided with a pair of relatively movable parts having bearing means thereon and means cooperating with said bearing means for operatively connecting said parts, each part being provided on the leading side thereof with an edge of reduced thickness and with an angularly disposed surface contiguous to the reduced edge whereby lubricant is picked up by each part and directed toward the bearing means of such part during rotation of the joint.

2. In a device of the character described the combination of a housing adapted to contain lubricant, and a universal joint rotatable in said housing, said joint being provided with relatively movable parts having cooperating bearing and journal portions, including a yoke member having spaced arms at least one of which is provided with a relatively elongated leading portion terminating in a relatively sharp leading edge and having an angularly disposed surface thereon contiguous to said leading edge whereby some of said lubricant is picked up and directed toward said cooperating portions upon rotation of the joint.

3. In a device of the character described the combination of a housing adapted to contain lubricant, and a universal joint rotatable in said housing, said joint comprising a pair of yoke members each having spaced arms, and connecting means cooperating with said spaced arms, each of said arms having an elongated tapered leading portion shaped to present an edge of reduced thickness and having an angularly disposed surface contiguous to said edge whereby said leading portion is adapted to act as a lubricant pick up means upon rotation of the joint.

4. In a device of the character described the combination of a housing adapted to contain lubricant, and a universal joint rotatable in said housing, said joint comprising yoke members having spaced arms provided with bearing portions, and means engaging said bearing portions for operably connecting said yokes, each of said arms having an elongated leading portion disposed in overlapping spaced relation to the trailing portion of an adjacent yoke arm to thereby form a passage for directing lubricant toward said bearing portions, said leading portion having an edge of reduced thickness and an angularly disposed surface contiguous to said edge whereby said leading portion is adapted to pick up lubricant during rotation of the joint.

5. In a device of the character described the combination of a housing adapted to contain lubricant, and a universal joint rotatable in said housing, said joint comprising yoke members having spaced arms provided with bearing portions and connecting means having trunnions engaging said bearing portions, said yoke arms being formed on their leading sides with edges of reduced thickness which project outwardly a greater distance than their trailing edges and are shaped to pick up lubricant upon rotation of the joint and to direct such lubricant to the inner ends of said trunnions.

6. In a device of the character described the combination of a housing adapted to contain lubricant, and a universal joint rotatable in said housing, said joint being provided with relatively movable parts having cooperating bearing and journal portions including a yoke member having spaced arms, said arms being formed with leading edges of relatively reduced thickness and having lubricant passages formed therein and extending from said leading edges to adjacent the inner ends of said journal portions for directing lubricant to the cooperating bearing and journal portions upon rotation of the joint.

7. In a device of the character described the combination of a housing adapted to contain lubricant, and a universal joint rotatable in said housing, said joint being provided with relatively movable parts having cooperating bearing and journal portions including a yoke member having spaced arms, said arms being formed with a leading edge and an inclined surface contiguous thereto, said inclined surface having a channel therein for directing lubricant toward said bearing and journal portions upon rotation of the joint.

8. In a universal joint adapted for operation in a lubricant containing housing, the combination of relatively movable members having cooperating bearing and journal portions including a yoke member having spaced arms, and means associated with said members forming a lubricant reservoir for feeding lubricant to the surfaces of the cooperating bearing and journal portions, one of said arms being provided with a passage communicating with said reservoir, said passage having its inlet end substantially at the leading edge of said one arm whereby lubricant is supplied to the reservoir upon rotation of said members.

9. In a universal joint adapted for operation in a lubricant containing housing, the combination of relatively movable members having cooperating bearing and journal portions including a yoke member having spaced arms, and means associated with said members forming a lubricant reservoir for feeding lubricant to the surfaces of the cooperating bearing and journal portions, one of said arms being formed with an elongated leading portion having an angularly disposed surface thereon, said surface having a channel therein for directing lubricant into said reservoir upon rotation of said members.

10. A universal joint for operation in a lubricant containing housing, comprising a pair of yokes having spaced arms, a connecting member, and cooperating bearing means on said arms and connecting member for establishing an operative connection therebetween, each arm having an integrally formed leading portion shaped to present an edge of reduced thickness with an angularly disposed surface contiguous to the reduced edge whereby lubricant is picked up by each arm and directed toward the bearing means of such arm during rotation of the joint.

CLARENCE W. SPICER.